Patented June 29, 1943

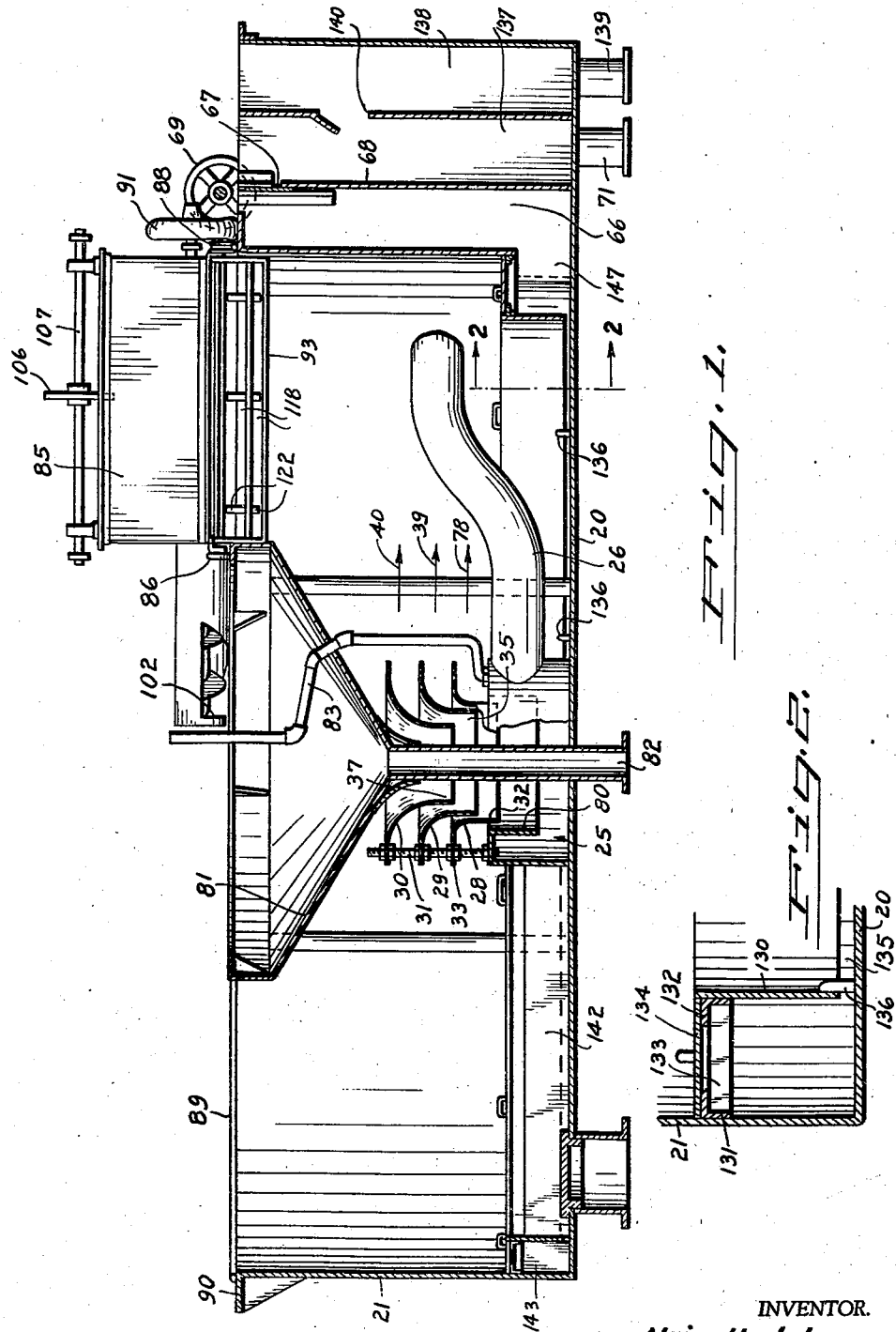

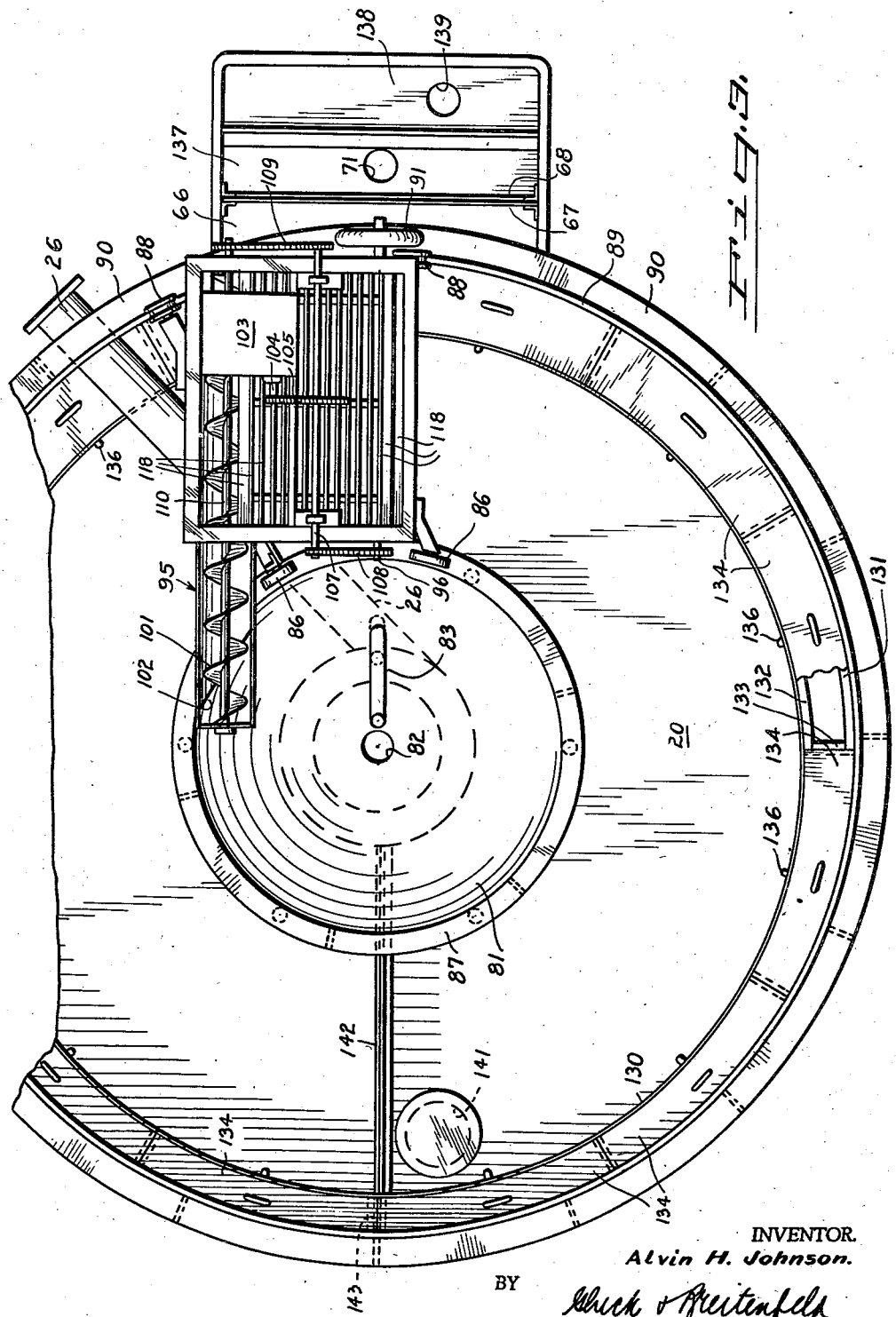

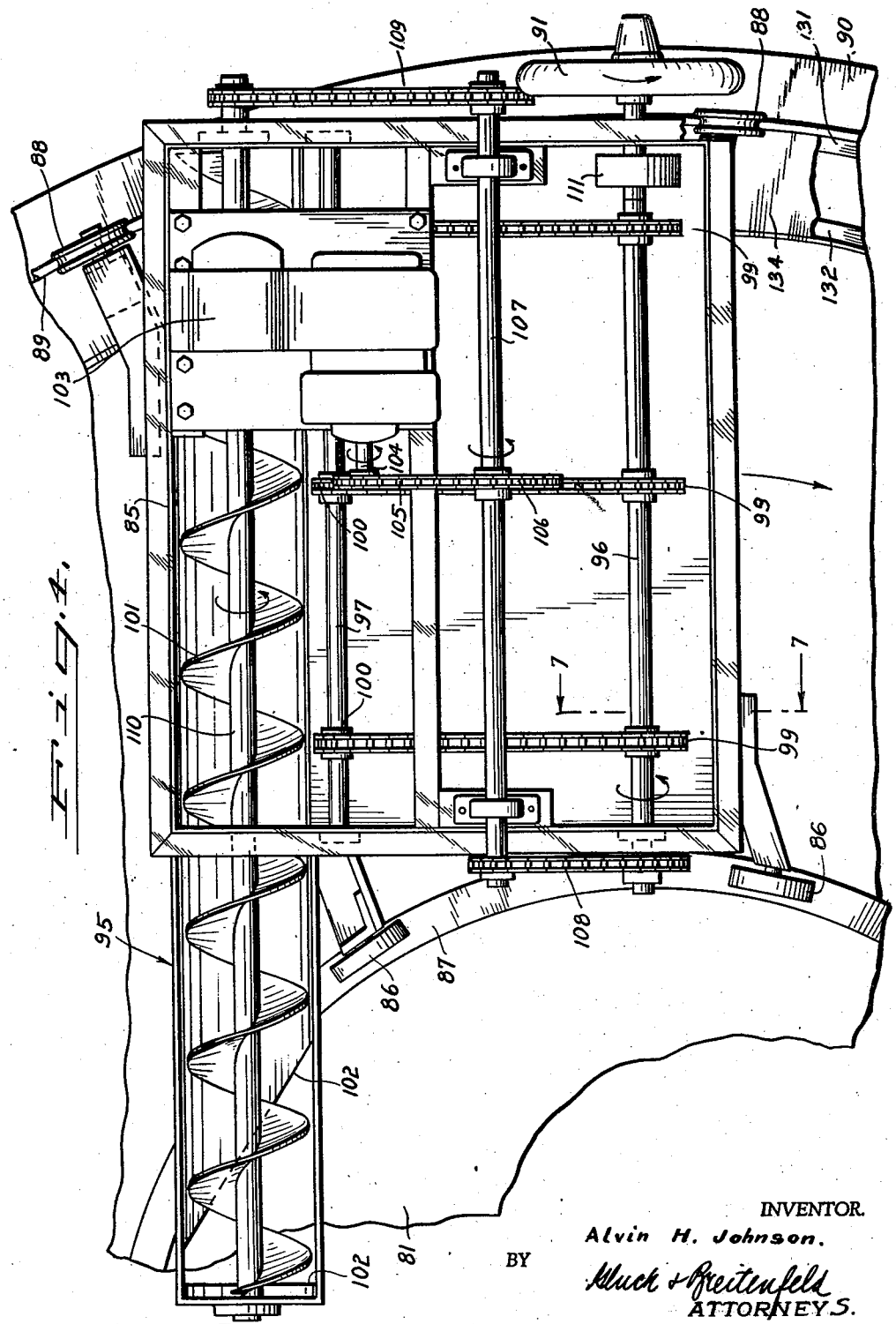

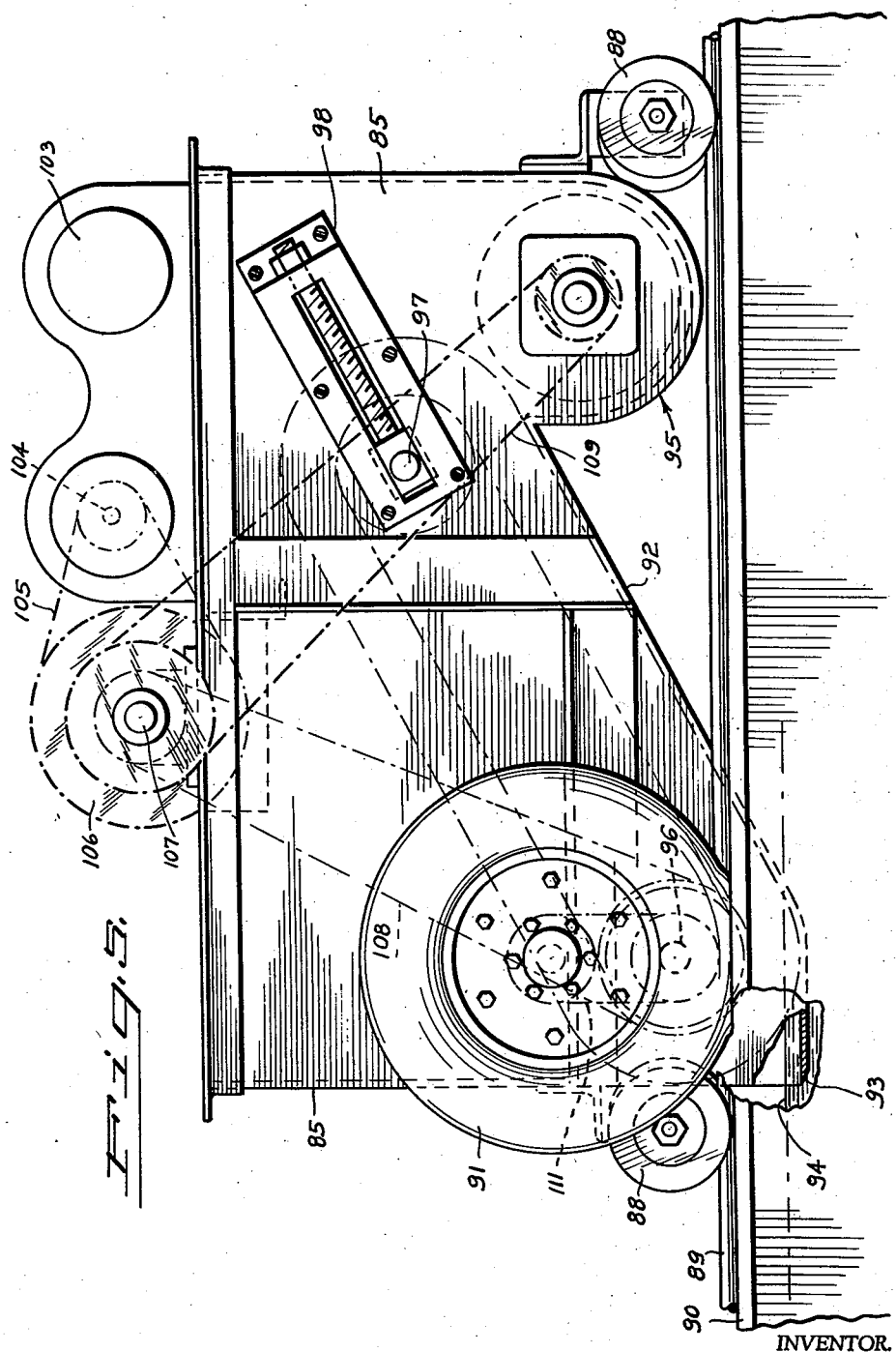

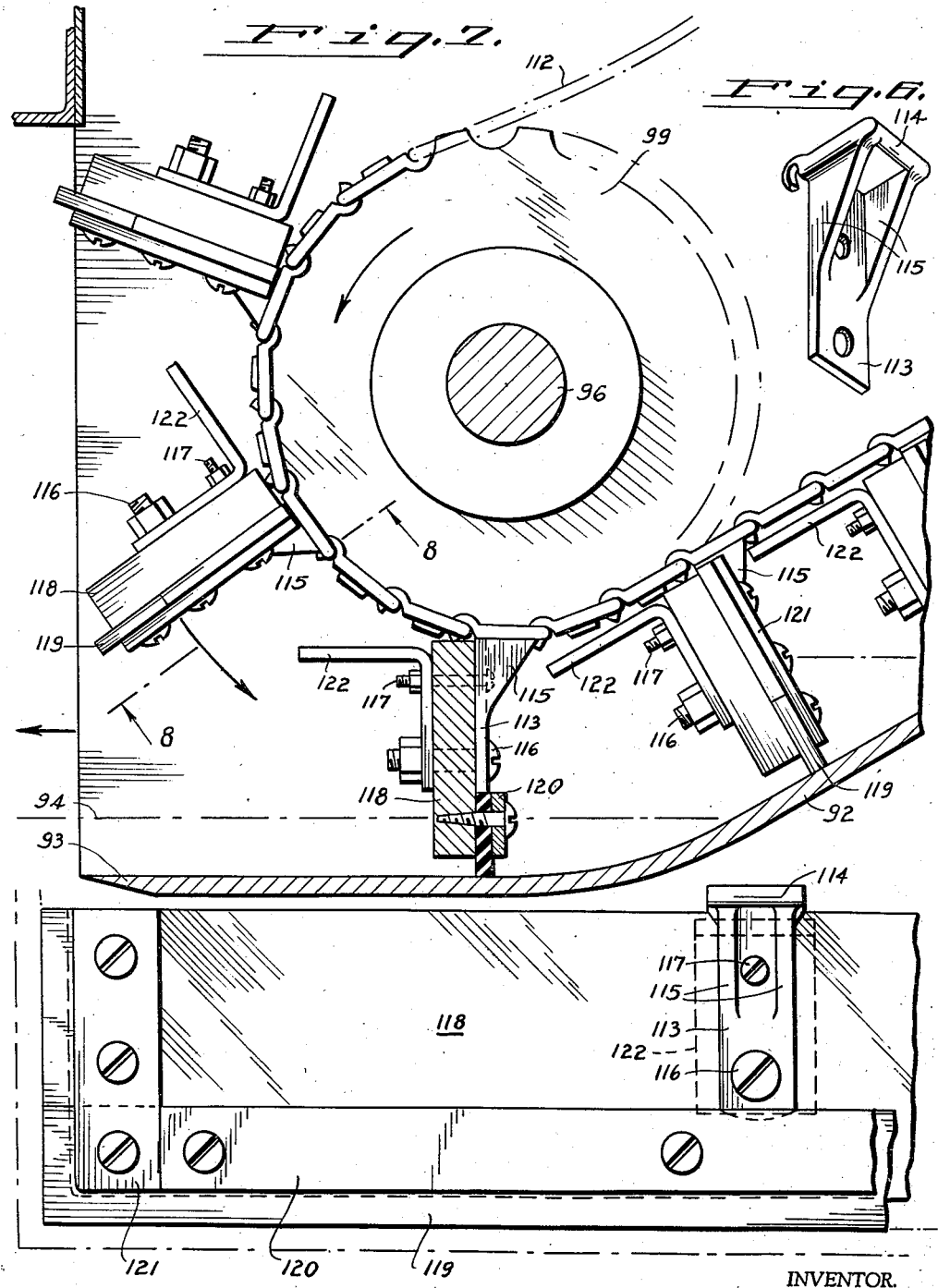

2,323,223

UNITED STATES PATENT OFFICE 2,323,223

FLOTATION TANK

Alvin H. Johnson, Mount Vernon, N. Y.

Application April 3, 1941, Serial No. 386,590

1 Claim. (Cl. 210—55)

My present invention relates generally to the clarification of liquids, and has particular reference to certain improvements in flotation tanks.

The kind of flotation tank to which my invention relates is adapted to accommodate a suspension from which suspended matter rises to the surface, where it may be removed. The separation of suspended matter may be brought about for the purpose of recovering this matter, or valuable ingredients that may be in it, or for the purpose of clarifying the suspension so as to avoid pollution of streams into which the clarified effluent is directed, or for the purpose of recovering the clarified effluent. Sometimes two or more of these objects are of importance.

One convenient way of inducing the suspended matter to rise to the surface lies in the introduction of a gas, such as air, into the supension prior to its introduction into the flotation tank. The tendency of this gas to separate from the liquid in the form of minute bubbles, and the ability of these bubbles to pick up suspended matter and cause it to travel with them, produces the desired result, whereby a more or less frothy scum of suspended matter floats on the surface of the suspension. However, in a procedure of this general character, turbulence is undesirable, and the more quiescent the gasified suspension is, the more quickly and efficiently are the solid particles separated from it.

It is one of the more important objects of my invention to provide a tank into which the suspension may be continuously introduced, and from which clarified effluent may be continuously withdrawn, with a minimum of turbulence. In accordance with my invention, the introduction of the suspension, and the withdrawal of the clarified effluent, are accomplished in a novel manner which establishes optimum flotation conditions.

Another important object of the invention is to provide a tank having the foregoing advantages and operating under atmospheric conditions. That is to say, the present improved tank is open to the atmosphere; and for this reason its operation is beset with none of the difficulties and complications of tanks operating under sub-atmospheric conditions.

Another object of the invention is to provide certain improvements in the instrumentalities for removing the supernatant matter. More particularly, I aim to provide an improved collector or skimming means which is not only thorough, efficient, and reliable, but which functions with a minimum of disturbance of the quiescent conditions under which the flotation of the suspended matter is proceeding.

A further object of my invention is to provide a simple regulable means for controlling and varying the consistency of the supernatant matter which is removed by the collector.

In general, my objective is to provide a tank of relatively simple and inexpensive structural character, requiring a minimum number of moving parts and accessories, whose operation is continuously visible, and which operates efficiently and with a maximum of capacity, notwithstanding wide fluctuations in the density of the suspension under treatment.

One of the characterizing features of my present invention lies in the continuous introduction of the suspension in the form of separate streams which enter the tank in substantially horizontal directions at superposed levels. This produces a minimum of turbulence, and establishes a highly desirable condition under which flotation proceeds continuously, efficiently, and in a minimum of space.

Preferably, the entering streams are caused to have substantially equal velocities, and preferably they radiate fanwise from the region of introduction of the suspension. Where the tank is substantially circular, it is preferable for the suspension to be continuously introduced at the central region of the tank.

In accordance with my invention, a collector is mounted for advancement across the tank and is provided with a forward partially submerged scoop. Mounted for advancement with the collector is a means for engaging the supernatant material encountered by the scoop, and for sweeping this material rearwardly into the scoop.

One of the features of the present improved construction lies in the provision of means for driving this sweeping means in such timed relation to the advancement of the collector that the lineal speed of the sweeping means is greater than the speed of advancement of the collector. This prevents the advancement of the partially submerged scoop from producing undesirable turbulence, and assures a continuous and efficient collecting of the supernatant material as the collector advances.

In a preferred embodiment of the invention, the tank is substantially circular, and the collector is mounted for continuous advancement along an arcuate path concentric with the tank.

Another feature of the invention lies in associating a trough with the collector, the trough preferably extending transversely with respect to the direction of advancement of the collector, and the sweeping means serving to deposit the accumulated supernatant material into this trough. In the trough, there is preferably provided a further means for transporting this material lengthwise of the trough toward a discharge region at one end of the trough. Where the tank is substantially circular, I have found it feasible to provide a centrally-disposed discharge receptacle, and I mount the trough in such a way that one end is arranged to empty into said discharge receptacle.

A further feature of my invention lies in an improved means for continuously withdrawing clarified effluent from the submerged peripheral regions of the tank. This comprises a conduit extending along the lower periphery of the tank and adapted to conduct the clarified effluent to a suitable overflow chamber.

It is a feature of my invention to provide the conduit with a constricted lateral inlet which communicates with the tank and is substantially coextensive with the conduit, whereby the clarified effluent may flow continuously from the tank into the conduit without causing any undesirable turbulence.

I achieve the foregoing objects, and such other objects as may hereinafter appear or be pointed out, in the manner illustratively exemplified in the accompanying drawings in which:

Figure 1 is an elevational cross-sectional view of a flotation tank embodying the features of my present invention, certain portions being omitted for the sake of clearness;

Figure 2 is an enlarged fragmentary cross-sectional view taken substantially along the line 2—2 of Figure 1;

Figure 3 is a plan view of the tank shown in Figure 1;

Figure 4 is a fragmentary plan view of the collector, on an enlarged scale;

Figure 5 is a side view of the collector, with certain portions shown diagrammatically;

Figure 6 is a perspective view of a certain detail of the sweeping means;

Figure 7 is an enlarged cross-sectional view taken substantially along the line 7—7 of Figure 4, showing certain further details of the sweeping means; and Figure 8 is an enlarged fragmentary view taken substantially along the line 8—8 of Figure 7.

The tank I have chosen to illustrate is substantially circular, and has a bottom wall 20 and a substantially cylindrical side wall 21. The structural details of the tank construction have been omitted for the sake of clearness, although it will be understood that any conventional or desirable mode of constructing, assembling, supporting, and reenforcing the various walls and other portions of the tank may be resorted to, these structural details being well known to those skilled in the art. The tank is open at the top, whereby the liquid in it is exposed to atmospheric pressure.

At the midportion of the tank, at a submerged region, I prefer to provide an entrance chamber 25 into which a pipe 26 extends. It is through this pipe that the suspension is continuously introduced into the tank, after the suspension has been suitably gasified or otherwise conditioned to bring about separation, by flotation, of suspended matter.

In the embodiment herein illustrated, the pipe 26 enters the chamber 25 tangentially. This produces a gentle swirl in the peripheral region of the chamber 25, but the depending partition 80 minimizes the extent to which this swirl is transferred, if at all, to the main body of liquid within the tank.

The partition 80 defines a central opening through which the entering suspension rises from the entrance chamber 25 into the tank. In accordance with my invention, this rising stream is divided into separate streams, and these streams are deflected or directed into substantially horizontal directions of entrance arranged at superposed levels.

A preferred way of accomplishing this object is shown most clearly in Figure 1. A series of superposed deflectors 28, 29 and 30 are arranged in spaced superposed substantially concentric relation over the chamber 25. These deflectors may be conveniently supported upon vertical rods 31 which extend up from the chamber 25 and which are provided with means to hold the deflectors in proper spaced relationship.

The deflectors are preferably of a configuration which provides each deflector with a lower edge arranged substantially tangent to a vertical cylinder, and with an upper edge of greater diameter arranged substantially tangent to a horizontal plane. In the illustrated construction, each deflector is substantially bell-shaped or campanulate. Thus, the deflector 28 has a lower edge 32 and an upper edge 33, the undersurface of the deflector serving as a guiding surface. Similarly, the deflector 29 has a lower edge 35, while the deflector 30 has a lower edge 37.

It will be observed that each of the edges 32, 35 and 37 is arranged so as to be encountered edgewise by the upwardly rising suspension. Regardless of the material of which the deflectors are made (which might be, for example, sheet metal or the like) these lower edges 32, 35 and 37 are caused to be attenuated so that they will function with maximum efficiency in splitting the stream into separate portions. It will be further observed that these edges are of successively diminishing radii of curvature, from the lowest to the highest. As a result, an annular portion of the upwardly rising suspension is caused to be guided by the deflector 28 into a substantially horizontal direction roughly indicated by the arrow 78. A similar annular portion of the rising suspension is split away by the edge 35 and guided by the deflector 29 into a substantially horizontal direction roughly designated by the reference numeral 39. A further portion of the stream encounters the edge 37 and is guided into the substantially horizontal direction 40. The balance of the suspension rises through the deflector 30.

In order that the superposed streams 78, 39, and 40 may have substantially equal entrance velocities (since it is differences in velocity which produce undesired turbulence), the vertical distances between the outer edge of the deflectors are so correlated to the radii of curvature of the lower edges 32, 35 and 37, that the cross-sectional area of each entering stream bears a predetermined ratio to the volume of the stream. Thus, in the illustrated construction, the lower edges 32, 35 and 37 are arranged to split the rising suspension into four streams of substantially equal volume, and since the vertical distance between the outer edge of deflector 30 and the outer edge of deflector 29 is substantially equal to the vertical distance between the outer edges of deflectors 29 and 28, and to the vertical distance between the outer edge of deflector 28 and the top wall of the chamber 25, it follows that the three entering streams 78, 39, and 40 have substantially equal entrance velocities.

In the embodiment herein illustrated I have shown a centrally-disposed discharge receptacle 81 which has an upwardly flaring portion disposed above the deflectors 28, 29, and 30, and a relatively constricted vertical tube portion 82 passing downwardly through the deflectors, through the chamber 25, and through the bottom wall 20 of the tank. In designing and arranging the deflectors 28, 29 and 30, the space occupied by the tube 82 should be taken into account, as well as the space occupied by, and the guiding effect of, the upper flaring portion of the receptacle 81.

While I have shown three campanulate deflectors, it will be understood that a lesser or greater number may be provided for, if desired.

This mode of introduction of the suspension into the tank in the form of separate streams results in getting a relatively large quantity of suspension into the tank with a very minimum of turbulence. And where the suspension is introduced at the central region of a circular tank, as in the illustrated construction, the superposed streams spread radially and fanwise into the tank, which reduces the speed of travel and thereby conduces to a highly desirable state of quiescence in the tank, allowing suspended matter to rise quickly and expeditiously.

Because of the fact that air or gas may have the tendency to accumulate in the peripheral region of the entrance chamber 25, i. e., in the annular space surrounding the partition 80, it is desirable to provide a vent pipe 83, extending from this portion of the chamber 25 upwardly through the flaring portion of the discharge receptacle to a point well above the liquid level of the tank.

The removal of the supernatant matter is effected, in accordance with my invention, by means of one or more collectors of the character illustrated most clearly in Figures 4 and 5.

The collector which I have chosen to illustrate herein is in the form of a substantially rectangular structure having upstanding side walls 85. This structure may be of any suitable character, and immaterial details have therefore been omitted from the present drawings. One convenient way of supporting this structure is to provide a pair of wheels or casters 86 which rest upon a flange 87 formed along the upper periphery of the discharge receptacle 81, and to provide one or two similar wheels or casters 88 which rest upon a suitable track 89 formed on the periphery of the tank. The wheels 88 are preferably grooved, so that their engagement with the track 89 serves not only as a support for the collector but also as a guide. The periphery of the tank is also provided with a flange or annular platform 90 upon which a traction wheel 91 rides. The rotation of the traction wheel 91 brings about the desired advancement of the collector with respect to the surface of the tank.

The bottom wall of the collector is shaped as shown most clearly in Figure 5. It has an inclined portion 92 which levels off at the forward end and terminates in the attenuated leading edge 93. This portion of the collector constitutes what I have designated as a scoop, and it will be observed that this scoop is arranged so that it is partially submerged beneath the liquid level 94. To permit this scoop to be effective, the forward upstanding wall 85 terminates short of the edge 93, whereby the structure is open at its forward lower portion.

The rear portion of the bottom wall of the collector designated by the reference numeral 95, is curved downwardly in a sort of U-shape and merges ultimately with the rear upstanding wall 85 of the structure. The portion 95 thus constitutes a collecting trough at the rear end of the scoop, this trough being arranged transversely with respect to the direction of advancement of the collector.

Mounted in the structure is a sweeping means which preferably assumes the form of an endless conveyer including flights arranged to sweep rearwardly with respect to the scoop. I prefer to provide this conveyer by means of two spaced shafts, sprocket wheels on the shafts, chains extending around said sprocket wheels, and flights carried by said chains. One of the shafts, 96, is arranged near the forward edge of the scoop, and the other, 97, in a relatively elevated position near the rear portion of the scoop. These shafts are suitably journaled in the side walls 85 of the collector structure, and an adjusting means 98, of any suitable character, is preferably associated with the shaft 97 to permit its adjustment toward or away from the shaft 96.

I have illustratively shown three sprocket wheels 99 mounted at spaced intervals on the shaft 96, and a corresponding series of sprocket wheels 100 mounted on the shaft 97. An endless chain 112 extends around each sprocket wheel 99 and around the corresponding wheel 100. These chains carry flights or paddles which serve to engage the supernatant material that is encountered by the scoop, to sweep it rearwardly into the scoop, and to push it ultimately into the collecting trough 95.

In the collecting trough I prefer to provide a means which I have shown in the form of a worm conveyor 101 for transporting the material that is deposited into this trough toward one end of the latter. Upon reference to Figure 4, it will be observed that the inner end of this trough is positioned over the discharge receptacle 81, and is provided with an opening 102, whereby the conveyor 101 pushes the collected material continuously into the discharge receptacle 81.

In accordance with my invention, a common driving means is provided for bringing about the desired advancement of the collector, for operating the sweeping means, and for operating the conveyer within the collecting trough. To accomplish this purpose I prefer to mount an electric motor 103 on the rear portion of the collector structure, any suitable means (not shown) being provided for the purpose of continuously supplying this motor with adequate electric power as the collector advances. The motor is preferably associated with a suitable speed-reducing mechanism (not shown in detail) which ultimately delivers the driving force of the motor to a driving shaft 104. By means of a suitable transmission belt or chain 105, the rotation of this shaft is transmitted to a wheel or pulley 106 mounted on a control shaft 107. The latter extends transversely across the collector structure, as shown most clearly in Figure 4. From one end of this shaft, a suitable transmission means 108 imparts rotation to the shaft 96, thereby actuating the sweeping means. From the other end of the shaft 107, a suitable transmission means 109 brings about the desired rotation of the shaft 110 on which the worm conveyer 101 is mounted. The traction wheel 91 is actuated from the shaft 96 by means of a suitable transmission means 111.

In Figure 7, there is visible only one of the sprocket wheels 99, and only one of the chains 112, but it will be understood that the other sprocket wheels 99 and the other chains 112 are similarly constructed and assembled.

Referring now to Figures 6, 7 and 8, it will be observed that the chain 112 (which is typical of the other similar chains) is composed of a series of suitable links adapted to be engaged by the teeth of the sprocket wheel 99. At regular intervals these links are specially constructed to permit the attachment of the flights. In the illustrated embodiment, every third link is constructed substantially as shown in Figure 6, being provided with a plate 113 extending at substantially right angles from the link portion 114, the lateral webs 115 serving as reinforcements.

The plate 113 is secured, by means of bolts 116 and 117, or similar fastening elements, to a board or element 118 extending transversely across the collector. It will be understood that the element 118 is similarly secured to the corresponding links of the other conveyer chains. At its periphery, the element 118 is provided with a sweeping strip 119, which may be composed of rubber or the like, this strip being held in position by means of a longitudinal clamping plate 120, and transverse end plates 121. The strip 119 is so constructed and designed that it will come into firm contact with the upper surface of the scoop, as well as with the side walls, as the sweeping means operates, thereby engaging the supernatant material that has been encountered by the scoop and pushing it rearwardly up the inclined portion of the scoop, ultimately depositing it in the collecting trough 95.

To prevent the flights from buckling under the weight of the material that is being pushed by them, each element 118 is provided with a series of angle members 122, each being adapted to bear against the corresponding conveyer chain, as shown at the right-hand portion of Figure 7, to keep the flight at substantially right angles to the axis of the chain during this portion of travel. There is an angle member 122 for each chain, and these angle members are preferably secured to the element 118 by the fastening members 116 and 117.

In operation, the actuation of the tractor wheel 91 causes the collector to advance across the tank at predetermined speed. Where the tank is substantially circular, as in the embodiment illustrated herein, the tractor wheel brings about continuous advancement of the collector along an arcuate path concentric with the tank. During this advancement, the forward partially submerged scoop encounters the supernatant material that has risen to the surface of the liquid.

This scoop alone would be inadequate to properly withdraw this supernatant material from the surface of the liquid, because the advancement of the scoop would have a tendency to push the supernatant material ahead of it, and to bring about a condition of turbulence that would defeat the desired purpose. In accordance with my invention, however, the sweeping means, consisting of the flights 119, is mounted for advancement with the collector, so that the supernatant material encountered by the scoop is continuously engaged and swept rearwardly into the scoop.

To accomplish the desired result to best advantage, it is an important feature of my invention to drive the sweeping means in such timed relation to the advancement of the collector that the lineal speed of the flights 119 is greater than the speed of advancement of the scoop. This desired timed relation is brought about by a suitable design of the transmission means between the driving shaft 104 and the driven shaft 96, and between the latter and the traction wheel 91. By imparting the proper diameter to the traction wheel 91, and by properly selecting the diameters of the pulleys or wheels with which the transmission elements 105, 108, and 111 engage, the desired result can be readily brought about, as will be readily understood.

The faster lineal movement of the flights 119, as compared with the speed of advancement of the scoop, brings about a continuous efficient pick-up of the accumulated supernatant material without disturbing the quiescence of the surface of the liquid generally, and without inducing any turbulence that would impair either the continued flotation of suspended matter or its efficient withdrawal.

Obviously, if desired, more than one collector may be used, but the operation will be the same in each case.

Also, it will be understood that the provision of a collecting trough at the rear portion of the collector, in the specific disposition shown in the present drawings, is not absolutely essential; and that the use of a conveyer in the collector trough, though preferable, is not imperative.

In accordance with my invention, the efficient continuous removal of the supernatant material, without disturbing the quiescence of the liquid in the tank, is accompanied by an equally efficient continuous withdrawal of clarified effluent. The preferred manner in which I accomplish this result is illustrated most clearly in Figures 1, 2 and 3.

Optimum clarification exists, in my opinion, in the submerged peripheral region of the tank, and for this reason this region is the one from which the clarified effluent can be continuously withdrawn to maximum advantage. With this objective in view I provide a conduit along this region, and this may be accomplished, if desired, in the manner shown, whereby I make use of the marginal region of the bottom wall 20 as the bottom wall of the conduit, and of the lower portion of the side wall 21 as the outer wall of the conduit. The inner wall of the conduit consists of a substantially vertical wall 130. This wall is provided with longitudinal angle members 132 (see Figure 2). The tank side wall 21 is provided with opposed angle members 131. Spaced transverse angle members 133 connect the members 131 and 132 and thus hold the wall 130 in proper fixed position. The top wall of the conduit is preferably composed of removable sections or cover plates 134 which rest upon the angles 131 and 132, and preferably extend between each pair of adjacent transverse angles 133.

The angle members 131 may be welded or otherwise secured to the inner surface of the side wall 21; the angle members 132 may be similarly welded or otherwise secured to the outer surface of the wall 130. The spaced transverse angle members 133 serve as braces.

In accordance with my invention, this resultant conduit is provided with a constricted lateral inlet which is substantially coextensive with the conduit. I prefer to form this inlet by terminating the wall 130 short of the bottom wall 20 of the tank, thereby providing a continuous narrow slit-like opening 135 adjacent to the very lowermost portion of the liquid in the tank. Small supporting rods 136 may be welded or otherwise secured to the wall 130, to aid in supporting this wall.

At one side of the tank, as shown for example at 147, I establish a communication between this conduit and a suitable overflow chamber 66. At the upper end of this chamber or box there is an adjustable weir 67. I have illustratively shown the weir with a fixed portion 68 and a movable upper portion capable of up and down adjustment by means of a hand wheel 69. The particular mechanism by means of which the actuation of the hand wheel 69 brings about an up and down adjustment of the movable portion of the weir has not been shown in detail, but will be readily understood by those skilled in the art. The clarified effluent flows over this weir into the section 137, and thence through a discharge pipe 71. To provide for the possibility of stoppage of the pipe 71, a second section 138 is provided, communicating through the pipe 139 with the sewer or other region of general discharge. Should the clarified effluent, for any reason, be prevented from leaving through the outlet 71, it will accumulate in the section 137 and ultimately flow over the edge 140 and thence out through the pipe 139.

Since the clarified effluent is to be continuously withdrawn from the entire peripheral region of the tank, I purposely impart to the conduit hereinbefore described a cross-sectional area which gradually increases toward the overflow chamber 66, and which gradually decreases to a minimum at a portion relatively remote from the overflow chamber. This will be clearly observed by comparing the width of the conduit at the right-hand portion of Figure 1 (or in Figure 2) with the width of the conduit at the left-hand portion of Figure 1.

The removability of the covers 134, conjointly defining the top wall of the conduit, allows access to the interior of the conduit for cleaning purposes. To further facilitate the cleaning of the tank in general, I provide a clean-out opening 141, as well as a radial partition 142. This partition has a separate continuation portion 143 within the conduit itself, and its purpose is to permit the cleaning of the tank to be accomplished in a progressive manner from the upper side of the partition (as viewed in Figure 3) in a clockwise direction toward the clean-out opening 141.

The overflow chamber I have provided is of particular advantage from the standpoint of controlling and varying the consistency of the supernatant matter that is removed by the collector. Since the adjustment of the weir in the overflow chamber controls the height of the liquid in the tank itself, the level of the liquid is thus capable of easy and accurate control and variation. If the level is relatively low, the scoop of the collector encounters proportionately more suspended matter and less liquid, whereas, if the level is relatively higher, the scoop encounters a greater proportion of liquid along with the supernatant matter.

It will thus be observed that I have provided a highly efficient flotation tank which, though relatively simple in structural nature, is unusually effective in maintaining optimum flotation conditions at all times, and in continuously withdrawing both the supernatant material and the clarified effluent without disturbing these conditions.

The uses to which the present flotation tank may be put will be understood by those skilled in the art. By way of example, it may be stated that the tank is of such a character that it is unusually well adapted for use in the paper making art, where so-called "white water," discarded from the wet end of a paper machine, requires clarification. Sometimes this clarification is desired in order that the liquid may be purified before it is recovered or discarded. Other times, clarification is desirable to recover the finely divided cellulosic material, with or without loading materials, from the white water.

In general, it will be understood that changes in the details, herein described and illustrated for the purpose of explaining the nature of my invention, may be made by those skilled in the art without departing from the spirit and scope of the invention as expressed in the appended claim. It is, therefore, intended that these details be interpreted as illustrative and not in a limiting sense.

Having thus described my invention and illustrated its use, what I claim as new and desire to secure by Letters Patent is:

In a flotation apparatus of the character described, a circular tank adapted to accommodate a liquid from which accumulated supernatant material is to be removed, a centrally-disposed discharge receptacle, a collector mounted for continuous advancement along an arcuate path concentric with the tank, said collector comprising a forward partially submerged scoop and a collecting trough at the rear end of said scoop, said trough extending transversely with respect to the direction of advancement of the collector and having one end arranged to empty into said discharge receptacle, means mounted for advancement with said collector for continuously engaging the supernatant material encountered by said scoop and sweeping it rearwardly into said scoop and thence into said collecting trough, and means in said trough for transporting said material lengthwise of the trough toward said discharge receptacle.

ALVIN H. JOHNSON.